(12) United States Patent
Thomson et al.

(10) Patent No.: US 8,887,243 B2
(45) Date of Patent: Nov. 11, 2014

(54) INTEGRATED SECURITY PLATFORM

(75) Inventors: Allan Thomson, Pleasanton, CA (US);
Charles Rodney Starrett, Cary, NC (US); Matthew Schott Bohmfalk Rodgers, Oakland, CA (US); Sean Convery, Mountain View, CA (US)

(73) Assignee: Cisco Technology, Inc., San Jose, CA (US)

( * ) Notice: Subject to any disclaimer, the term of this patent is extended or adjusted under 35 U.S.C. 154(b) by 361 days.

(21) Appl. No.: 13/361,029

(22) Filed: Jan. 30, 2012

(65) Prior Publication Data
US 2013/0198808 A1   Aug. 1, 2013

(51) Int. Cl.
  *H04L 29/06* (2006.01)
  *G06F 21/20* (2006.01)

(52) U.S. Cl.
  USPC ........................................ 726/4; 726/6; 726/1

(58) Field of Classification Search
  CPC ..... H04W 12/06; H04L 63/105; H04L 63/08; H04L 63/102; H04L 63/10
  See application file for complete search history.

(56) References Cited

U.S. PATENT DOCUMENTS

| 7,590,418 | B1 | 9/2009 | Thomson | |
|---|---|---|---|---|
| 7,814,311 | B2 | 10/2010 | Convery et al. | |
| 2006/0233166 | A1* | 10/2006 | Bou-Diab et al. | 370/389 |
| 2009/0119762 | A1 | 5/2009 | Thomson et al. | |
| 2010/0241748 | A1* | 9/2010 | Ansari et al. | 709/225 |

OTHER PUBLICATIONS

Microsoft "Micosoft Reputation Services: safer employee Web surfing", 2010, p. 1.*

* cited by examiner

*Primary Examiner* — Jung Kim
*Assistant Examiner* — Ghodrat Jamshidi
(74) *Attorney, Agent, or Firm* — Edell, Shapiro & Finnan, LLC

(57) ABSTRACT

An integrated security platform that enables a wide variety of network security elements to share security information in a comprehensive manner so as to provide automation of policy and security enforcement based on intelligence gathered by the different network security elements. The integrated security information platform provides the ability to clarify security intelligence by simplifying the collection and indexing of security information so that the information is visible and accessible to systems wanting to make use of the security information, without requiring all of the information to be co-resident with the infrastructure of the security platform or requiring the various systems to have pair-wise relationships with one another.

26 Claims, 8 Drawing Sheets

INTEGRATED SECURITY PLATFORM

TECHNICAL FIELD

The present disclosure relates to the integration of security information in a computing network.

BACKGROUND

There are many different network devices and security applications/products (collectively referred to herein as network security elements) available from different vendors that perform various security operations such as vulnerability assessment, policy enforcement, etc. In order for network security elements to perform their operations, the elements need to obtain security information/data from one or more other sources (e.g., network devices, applications, services, servers, mobile devices, etc.). Network security elements generally gather the security information from different sources using a variety of different protocols and methods, and there is no mechanism that enables consistent use of security data. Without the consistent use of security data, most networks are made less secure at deployment and during operation. Also, most users of network security information today do not leverage the data properly due to the difficulties in accessing and sharing the security information.

Different types of security information may be produced or used by different network security elements. Security information may include, but is not limited to: raw security events, network flow information, identity information, security configuration information, security intelligence information, reputation information, correlated security analysis, and security reports. Security information may also include: indexes of information, policy, configuration settings, topology (physical, layer 2, and/or layer 3), network flow information, deep packet inspection of data and control plan traffic, control plane events, content security events, policy (e.g., network, control, endpoint), posture assessment information, compliance rules and assessment, profiling assessment information, statistical counts and analysis of the statistics on traffic patterns, etc.

DESCRIPTION OF EXAMPLE EMBODIMENTS

Overview

Figure 1A:
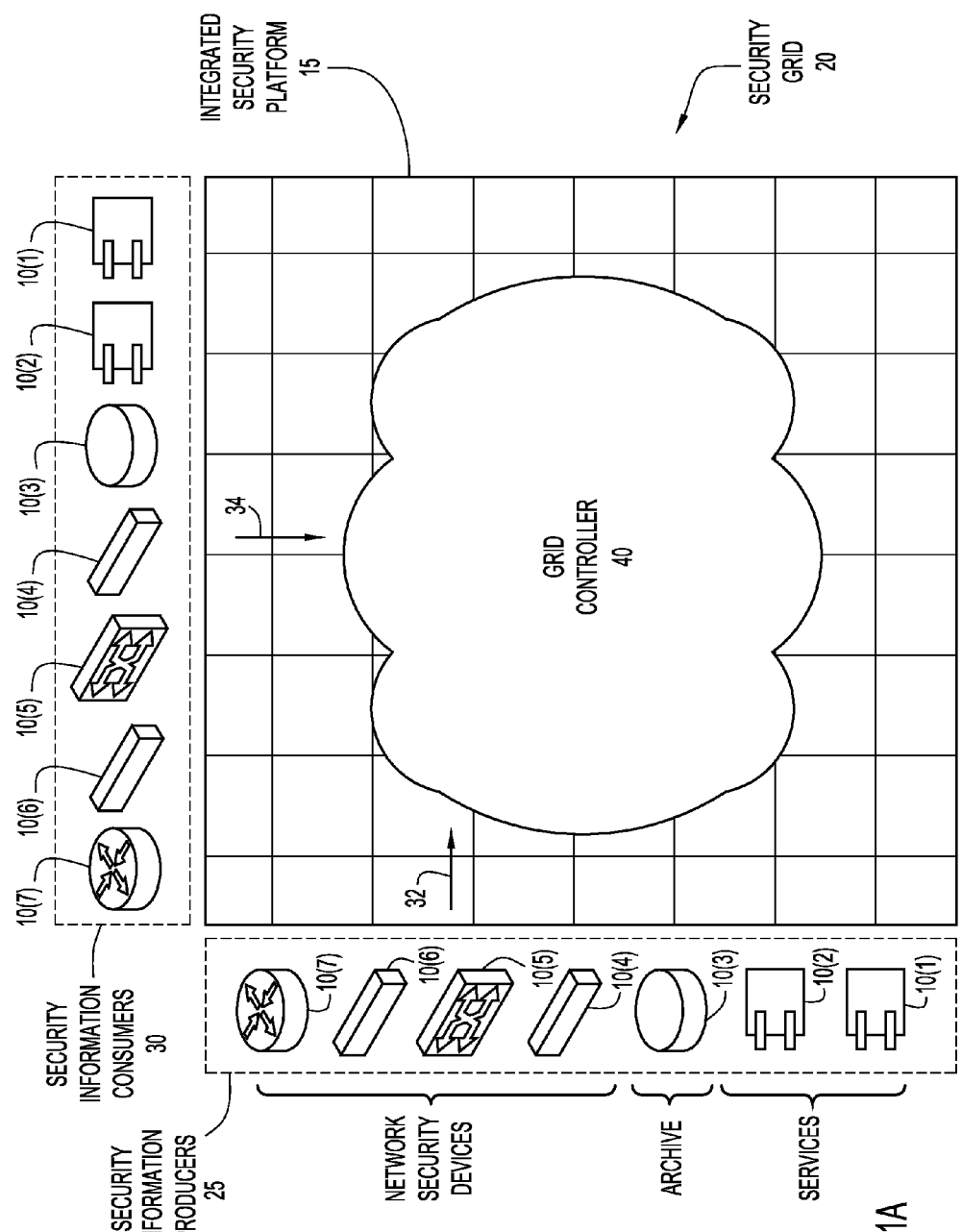
FIGS. 1A-1C are diagrams of a computing network in which a plurality of network security elements are connected to an integrated security platform.

Devices, methods and instructions encoded on computer readable media are provided herein for implementation of an integrated security platform that enables different network security elements to share security information/data. The integrated security information platform provides the ability to clarify security intelligence by simplifying the collection and indexing of security information so that the information is visible and accessible to other systems.

In accordance with one example, publication notifications are received, at a integrated security platform at least partially implemented on a computing device. The publication notifications are received from one or more of network security elements and the notifications advertise security information that is available for publication by the one or more network security elements. A subscription notification is also received at the computing device from a first one of the plurality of network security elements. The subscription notification identifies security information desired by the first security element. The publication and subscription notifications are evaluated to determine a second network security element configured to publish security information corresponding to the security information desired by the first network security element. The first and second network security elements are then connected via the security platform so as to share the corresponding security information. This connection occurs without a pre-existing relationship between the first and second network security elements.

Example Embodiments

Computing networks generally consist of multiple network components that span physical, network and security infrastructure. Although these different network components need security management and control, the network security functionality (implemented by network security elements) currently occurs without any significant collaboration or intelligent coordination across the elements. That is, in conventional arrangements the network security elements are generally autonomous systems and there is little or no shared management or control plane coordination across the systems. Additionally, there is little commonality in how conventional security systems define security mechanisms, protocols, and how/where the systems are deployed.

As such, conventional network arrangements have a limited ability to gather security information/data across the network infrastructure. In one conventional arrangement, in order for the autonomous systems to share security information, the systems are preconfigured for communication (i.e., pre-existing relationships are needed between different network elements to enable that communication). In other words, a pair-wise authentication relationship is created between two systems such that the systems are each authenticated to communicate via a secure communication link. It would be appreciated that knowledge of the format of the information, as well as the semantics of the information, need to be configured into a system each time the system establishes a relationship with a new system. In other conventional arrangements, a network administrator or network security operator manually gathers information from many different systems so that security information may be combined into a single repository that may be accessed by different network security elements.

FIG. 1A is a schematic diagram of a computing network 5 having one or more computing devices that implement (in hardware and/or software) the functionality of an integrated security platform 15. The integrated security platform 15 enables a wide variety of discrete network devices and security applications/products (collectively referred to herein as network security elements) to share security information/data in a comprehensive manner so as to provide automation of policy and security enforcement based on intelligence gathered by the different network security elements. In other words, as detailed below, the integrated security information platform enhances security intelligence by making information visible and accessible to other systems without requiring all of the information to be collected within the infrastructure of the security platform and without requiring the various systems to have pair-wise relationships with one another. Although the integrated security platform 15 is a logical arrangement of hardware/software components implemented in one or more computing devices (e.g., servers, controllers, etc.), examples will be described herein, for ease of illustration, with reference to network security elements and other components connecting to the integrated security platform 15 (or components thereof).

Computing network 5 comprises a plurality of different network security elements 10(1)-10(7) connected to the integrated security platform 15. Network security elements 10(1)-10(7) may take a number of different forms but, in the example of FIG. 1A, network security elements 10(1) and 10(2) are services, network security element 10(3) is an archive, and network security elements 10(4)-10(7) are network security devices (e.g., routers, switches, firewalls, etc.). Other network security elements include, but are not limited to, wireless local area network (WLAN) controllers, access points, policy enforcement services, network management software, servers (virtual private network (VPN) termination servers, video servers, etc.) and/or clients.

A component of the integrated security platform 15 is a communication fabric referred to herein as a "security grid" 20 that is controlled by grid controller 40. Generally, the security grid 20 is a collection of hardware/software components implemented on one or more computing devices that collectively function as a logical communication bus linking the plurality of network security elements. The logical communication bus may be one or more wired or wireless links managed by grid controller 40. As described further below, grid controller 40 authenticates and authorizes network security elements to the security grid 20, enables secure communication (over a secure encrypted data channel), and performs indexing and/or exchange of security information between the different network security elements 10(1)-10(7). The security grid 20 enables authenticated and authorized network security elements that are connected thereto to act on security information content published into the grid, and there is no need for the network security elements to be aware of the mechanisms and underlying information gathering requirements used by the grid 20 to provide the information.

The security grid 20 connects all of the communicating network security elements such that information usable by other systems can be published in a distributed and scalable way (i.e., no one system functions as a bottleneck for the information). These publishing systems are referred to herein as security information producers 25.

The security grid 20 also connects to network security elements that seek use of the security information published into the grid. These consuming systems are referred to herein as security information consumers 30. Security information consumers 30 leverage the security grid 20 to receive information without knowledge of where the data came from or how it was obtained. This simplifies the system implementation so that the consumers can focus on the content of received information, rather than on how the information is received (i.e., information speed/feeds, protocols, etc.). The network security elements 10(1)-10(7) may consume as well as produce security information for the purpose of, or as a result of, their security functions. Therefore, as schematically shown in FIG. 1, the network security elements 10(1)-10(7) are listed as security information producers 25 along one edge of security grid 20, and also listed as security information consumers 30 along a second edge of security grid 20.

It is noted that, as detailed below, security grid 20 provides a peer-to-peer communication fabric where the control logic is centralized but the actual data can be distributed in both multicast (e.g. pub-sub) and unicast (i.e. peer-to-peer) mechanisms. In other words, the integrated security platform does not require a centralized entity where all information is gathered before that information is distributed to other consuming systems.

The security information that is published/advertised may be structured or unstructured data. The publication may include not only the type of security information, but also other characteristics of the information, such as reputation of producers, speed of data, volume of data, aggregation options, etc. For advertised indexes, key identification attributes may be shared and the set of information available for those keys may not be published directly, but rather accessible through queries. A master data type directory may be made available by the security grid 20 to enable simple data type availability determination. This enables network security elements 10(1)-10(7) to subscribe to the right type of data for use in their security functions, as well as data having the other characteristics that fit their specific needs. The integrated security platform 15 provides a single protocol to gather security information from disparate systems into a single virtual data store.

Connection to the security grid 20 and communication of security information over the grid is managed by an entity called the grid controller 40. The grid controller 40 provides signaling for the security grid 20 such that information flows to the correct systems over the optimal path. In general, the grid controller 40 provides the control plane of the security grid 20 and all operations in the data plane of the grid have been authenticated and authorized to occur.

In operation, security information producers 25 will send notifications, referred to herein as publication notifications, to grid 20 for processing by grid controller 40. The publication notifications advertise the type, attributes, etc., of security information that may be generated by each of the specific network security elements. In other words, each network security element 10(1)-10(7) that functions as a security information producer will publish a list of security information and/or capabilities that they can provide to other systems. Integrated security platform 15 may maintain a directory (virtual index) of this information along with an identification of which network security element is associated with the information. Arrow 32 in FIG. 1A represents a sample publication notification.

The integrated security platform 15 also enables other network security elements that function as security information consumers to view the advertised information and subscribe to any information. More specifically, security information producers 30 may send notifications, referred to herein as subscription notifications, to security grid 20 for processing by grid controller 40. The subscription notifications identify the security information desired by the specific network security elements. Based on the subscription notifications and publication notifications, the grid controller 40 may then connect one or more security information consumers 30 to one or more security information producers that can provide the requested information. Arrow 34 in FIG. 1A represents a sample subscription notification.

The publication/subscribe notifications identify data (e.g., indicate the type of data) and additional messages that contain the actual data may be sent using other notifications in the same channel. In certain circumstances, higher bandwidth data that has been advertised as available can be sent directly from one system to another using the optimal protocol (i.e., peer to peer). For example, the publication/subscription notifications noted above may be used to advertise netflow generation capability and the interest in this capability, but the netflow information may be shared between the peer devices through direct use (by the peers) of the netflow transport protocol.

Figure 1B:
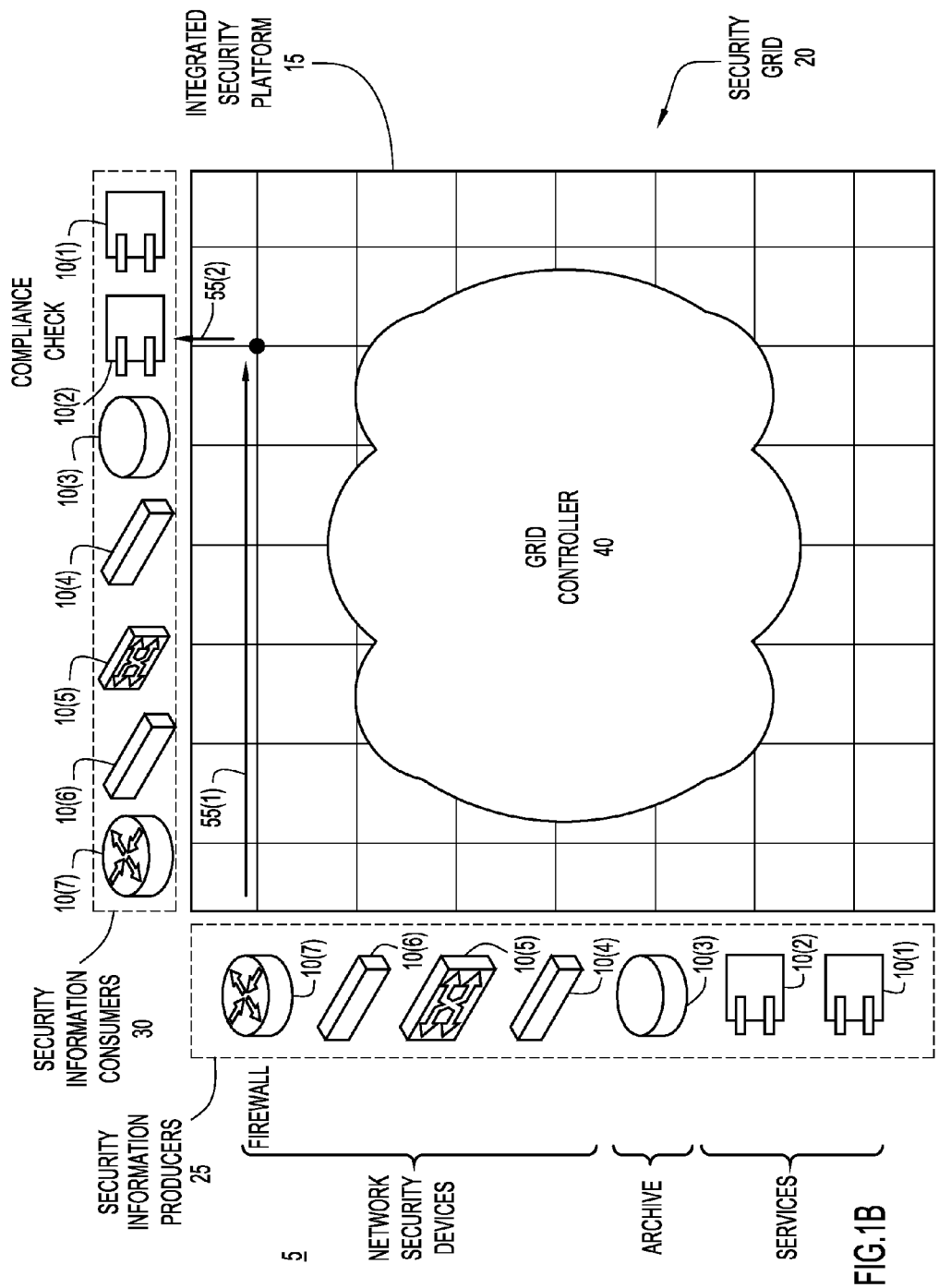

For example, and now with reference to FIG. 1B, network security element 10(7) is a firewall that operates as a security information producer and network security element 10(2) is a compliance check service that operates as a security information consumer. Firewall 10(7) advertises (via publication notifications to security grid 20) a capability to produce access logs at certain line rate(s). Compliance check service 10(2) registers interest in, or previously registered interest in, (via subscription notifications to security grid 20) access logs at less than a one second delay. Based on the publication and subscription notifications, grid controller 40 enables direct communication between firewall 10(7) and compliance check service 10(2) so that the security information desired by compliance check service 10(2) may be directly delivered by the firewall 10(7). This is schematically represented in FIG. 1B by arrows 55(1) and 55(2). As such, grid controller 40 enables firewall 10(7) and compliance check service 10(2) to automatically communicate with each other (via security grid 20) to share security information, without a pre-existing relationship between them (i.e., without a prior exchange of authentication information between firewall 10(7) and compliance check service 10(2)). In other words, no pairwise relationship is needed between the firewall 10(7) and compliance check service 10(2).

Figure 1C:
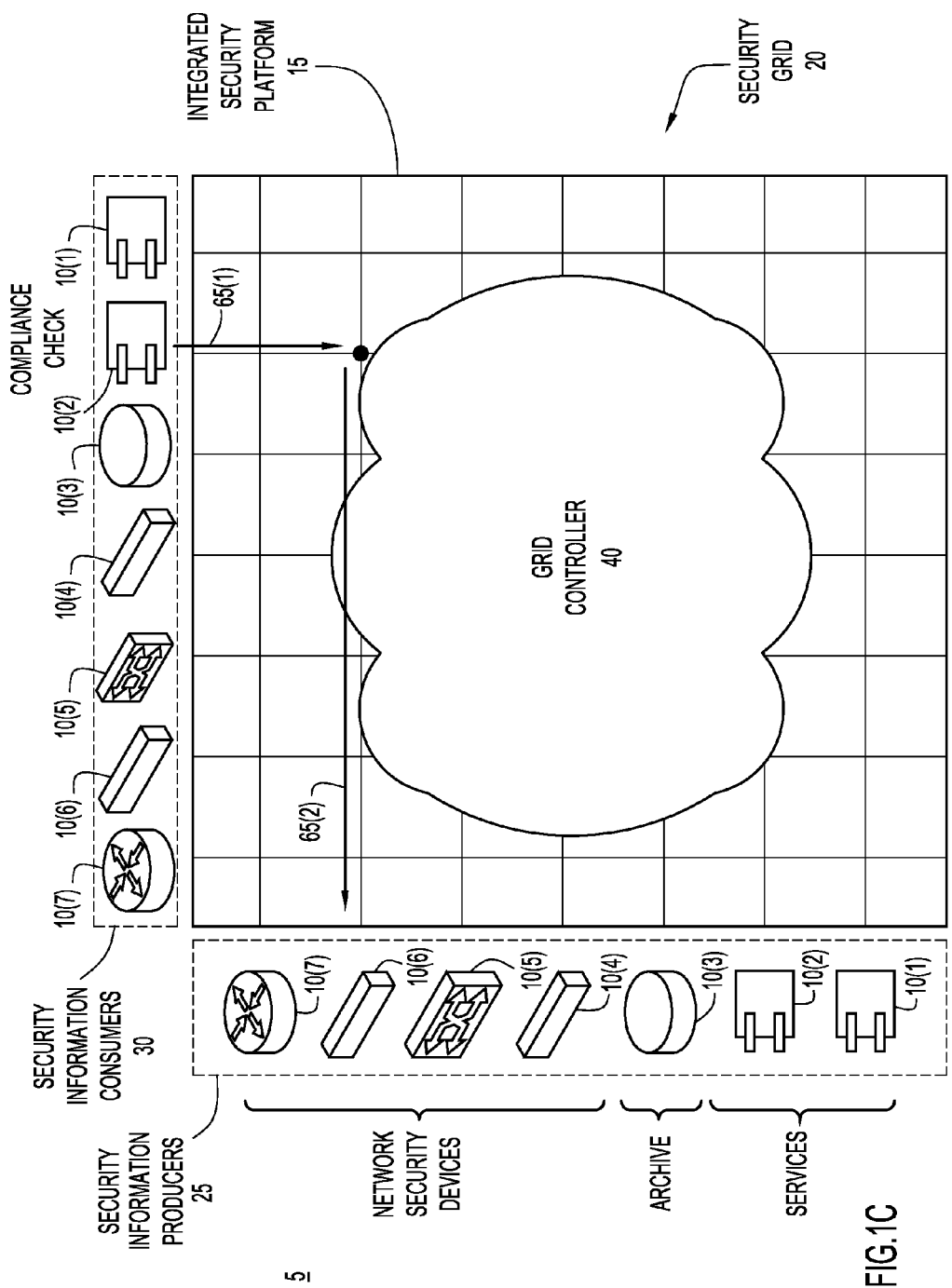

Continuing with the above example, after compliance check service 10(2) receives the desired security information, compliance check service 10(2) performs one or more operations to analyze the information and generate a result. Specifically, compliance check service 10(2) analyzes the information to determine if the network 5, or a portion of the network, is in compliance with a predetermined requirement/condition. At this point, compliance check service 10(2) becomes a security information producer that publishes the availability of the results of the analysis (i.e., the results of the compliance check) back into the security grid 20 for use by one or more other network security elements. For example, network security element 10(6) may be subscribed to compliance information and automatically take appropriate corrective action (i.e., disconnect elements, prevent certain communications, etc.) when the network 5 is out of compliance. Grid controller 40 is aware that network security element 10(6) is interested in compliance information (as a result of one or more subscription notifications) and may connect the network security element 10(6) to compliance check service 10(2) so that the network security element receives the result generated by compliance check service 10(2). This exchange of security information is schematically shown in FIG. 1C by arrows 65(1) and 65(2). Accordingly, security grid 20 enables the network security elements to automatically (i.e., without the need for intervention by a network administrator or other user) to take corrective action based on information generated by a network security element to which it did not have a pre-existing relationship.

It should be appreciated that the exchange of security information as described with reference to FIGS. 1B and 1C is merely illustrative and that numerous other types of security information may be exchanged in other examples. In another example, network security element 10(4) is configured to perform access control and publish to security grid 20 that it has the ability to capture user authentication attempts. Archive 20(3) registers an interest in user authentication attempt information and grid controller 40 coordinates setup for direct connection between network security element 10(4) and archive 10(3) such that network security element 10(4) sends the user authentication attempt information to archive 10(3). This coordination is performed without involvement of a network administrator and without a prior relationship between network security element 10(4) and archive 10(3).

In a variation of the above example, archive 10(3) may be further configured to advertise the capability to generate a report, on a regular basis (e.g., daily, weekly, etc.), of user authorization failures. This report may be generated based on the information received from network security element 10(4). Compliance check service 10(2) may (in response to the advertisement or in a previous subscription notification) register an interest in such weekly reports. The grid controller 40 may then connect compliance check service 10(2) to archive 10(3) such that the reports may be gathered by compliance check service 10(2). Again, this coordination is performed without involvement of a network administrator, without a prior relationship between compliance check service 10(2) and archive 10(3), and without knowledge by compliance check service 10(2) as to where the underlying information originally was obtained. That is, there is no need for compliance check service 10(2) to be aware that the information used to generate the reports was initially obtained at a different network security element (i.e., network security element 10(4)). Accordingly, integrated security platform 15 allows the various network security elements to operate autonomously (i.e., without knowledge of one another, without authenticating one another, without being configured for communication with one another, etc.), while still sharing security information in an integrated and comprehensive manner.

A number of different types of security information producers and consumers may be implemented in accordance with examples described herein. In particular, any system that is in the network data path, control path, or in the periphery (around the perimeter) protecting the security can be an information producer and/or consumer. In one example, a security information producer is a network switch that may be configured to advertise the ability to publish information regarding detection of Internet Protocol (IP) source address spoofing attacks, Dynamic Address Resolution Protocol (ARP) inspection, perform Dynamic Host Protocol Configuration (DHCP) snooping, discovery protocol monitoring, port security operations, etc. In other examples, security producers may be embodied in an Identity Services Engine (ISE) (i.e., an appliance or virtual machine to enforce security policy on users and devices that attempt to gain access to network infrastructure) configured to advertise the ability to obtain session information, a router configured to advertise the availability of route tables or netflow collection results, a server advertising the availability of different types of data, or wireless controllers, firewalls, compliance services, firewalls, etc. The same or other network security elements may also operate as security information consumers. The listed types of security producers are merely for purposes of illustration and other types of network security elements may be implemented in different examples.

In summary of the above, different security products need a comprehensive way to share security information across many different systems. The integrated security platform 15 provides a mechanism to gather security data or index security data in a consistent manner, provide a single method to access the data by collection or index, provide a single virtual data store where certain key data is stored (but not all data), and enable external applications to leverage or contribute their data to the system. In other words, the integrated security platform 15 provides the ability to publish data into a system that can be subscribed to by another party without having a pre-existing relationship between the two parties. This enables automated and collaborative processing that takes advantage of security information without direct knowledge of the complexity of gathering the information directly (which is often a manual process). In other words, the network security platform 15 involves assimilating multiple disparate security tools/applications into a universal/unified platform from which policy actions are made that take into account a wide range of security functions without requiring individual administration of the security tools/applications. Security information and policies may be automatically exchanged with multiple security tools/applications. The network security platform 15 integrates different security tools/applications so that each becomes aware of the other automatically. In so doing, the network security platform 15 provides an interface for exchanging information for a version of schema information that is self-describing.

Figure 2:
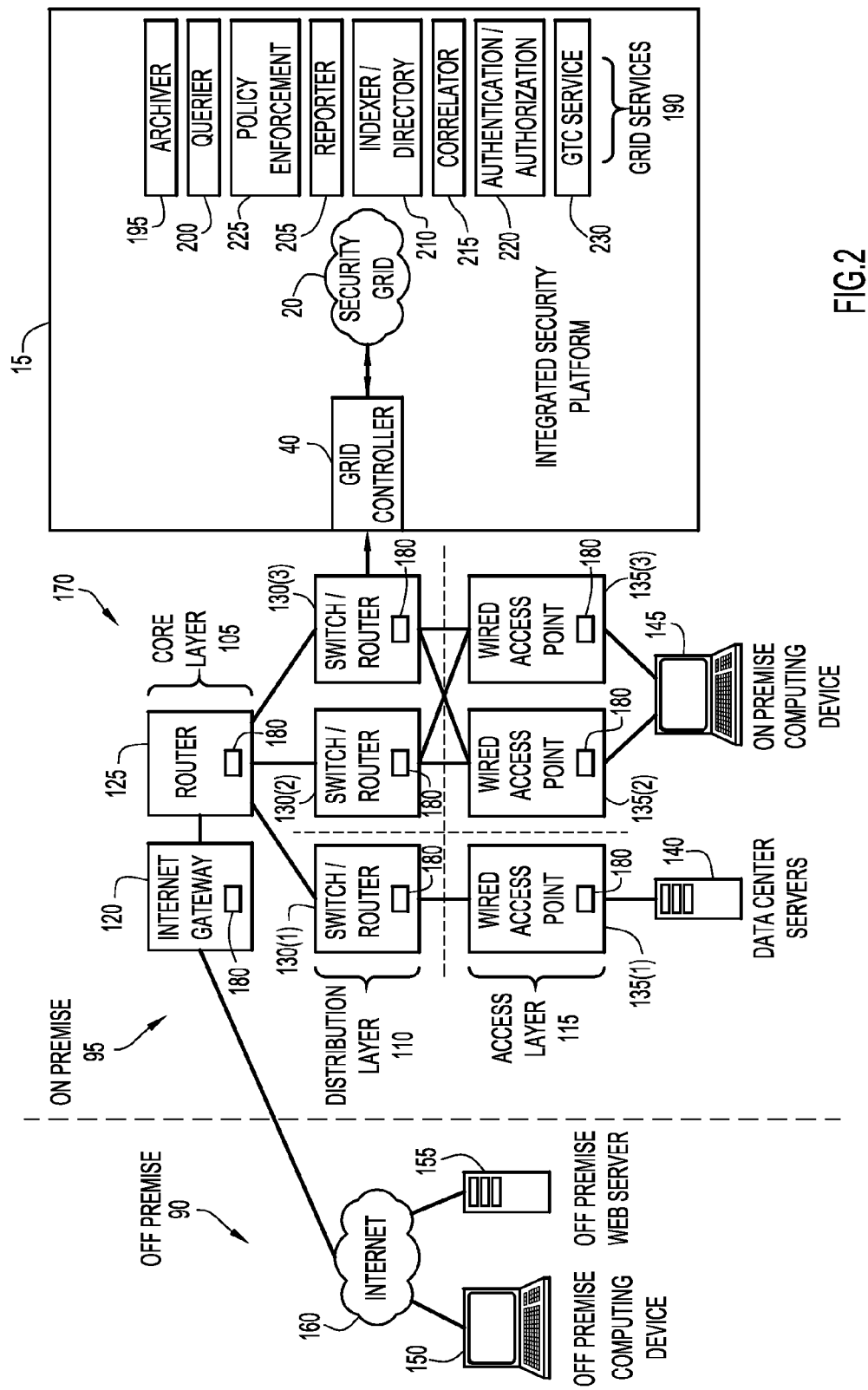
FIG. 2 is a block diagram of the integrated security platform deployed in an enterprise environment.

FIG. 2 is a schematic block diagram of a computing enterprise 80 having network security elements connected to the integrated security platform 15. Enterprise 80 comprises an off premise portion 90 and an on premise portion 95. The on premise portion 95 comprises a core layer 105, a distribution layer 110, and an access layer 115. Core layer 105 comprises an Internet gateway 120 and a router 125, while distribution layer 110 comprises a plurality of switches (or routers) 130(1)-130(3). Access layer 115 comprises a plurality of wired access points or switches 135(1)-135(3). Wired access point 135(1) is connected to one or more data center servers 140, while wireless access point 135(2) and wired access point 135(3) are connected to a computing device 145. Off premise portion 90 comprises a computing device 150 and a web server 155 configured to communicate with Internet gateway 120 via the Internet 160.

Internet gateway 120, router 125, switches 130(1)-130(3), and access points 135(1)-135(3) are network security elements that each provides various security functions. As such, Internet gateway 120, router 125, switches 130(1)-130(3), and access points 135(1)-135(3) are collectively referred to herein as network security elements 170. In this example, the network security elements 170 share security information through the use of integrated security platform 15 that, as noted above, comprises security grid 20 and grid controller 40.

Grid controller 40 processes publication and subscription notifications from the network security elements 170, and coordinates the exchange of security information between the network security elements. Grid controller 40 is configured to communicate with network security elements 170 via, for example, a secure layer 3 connection. Grid controller 40 may authenticate the network security elements 170 when they connect to grid 20, as well as authorize the operations that may be performed by each of the network security elements 170.

Network security elements 170 may either advertise the availability of different types of security information (via publication notifications) or advertise a desire to subscribe to different types of security information (via subscription notifications). In other words, network security elements 170 may be security information producers or security information consumers. The advertisements/notifications by network security elements 170 are enabled by software agents embedded in the elements, referred to as grid agents 180. Grid agents 180 interact with grid controller 40 to exchange the notifications and to create the connections in which a security information producer may directly share security information with one or more security information consumers. Grid agents 180 may each include a software component, referred to herein as a proxy agent, that enables data gathering and conversion from one or more other data formats and feeds that data into the security grid 20. This software component is able to take data from the security grid 20 and supply that data back to the host network security element.

Also shown in FIG. 2 is a plurality of grid services 190 that are implemented as part of security grid 20. Grid services 190 may be software applications that operate on security information that is received by the security grid 20. Certain grid services 190 may publish information for use by one or more network security elements 170. Grid services 190 are generally divided into three different functional classes of services referred to as base services, intelligence services, and integration services. Base services are software components that provide a core set of functions (e.g., archiving, indexing, querying, etc.) that may be used by other services. Intelligence services are software components that perform one or more operations on the security information flowing into security grid 20. The intelligence services are value add services that run on top of, and may make use of, one or more of the base services. For example, an intelligence service uses grid information for analysis and determination, publishes the availability of the results of the analysis to security grid 20 for later use by other services. Integration services are software components that interact with external data sources to pull data into the security grid 20. Similarly, an integration service could take data from security grid 20 and feed it to the external systems.

In FIG. 2, the grid services 190 comprise archiver service 195, querier service 200, reporter service 205, indexer/directory service 210, correlator service 215, authentication/authorization service 220, policy enforcement service 225, and Global Threat Correlation (GTC) integration service 230. Grid controller 40 controls and coordinates run-time of the grid services 190 as well as the exchange of security information between grid services 190 and network security elements 170.

Authentication/authorization service 220 may be used to authenticate network security elements 170 or other services and to authorize the operations permitted by the network security elements or services. For example, authentication/authorization services 220 may be used to determine if a specific network security element (e.g., a compliance engine) is allowed to access the security grid 20 (i.e., authenticate the network security elements). If a network security element 170 cannot be authenticated, the element is denied access to the security grid 20. The grid controller 40 may also use the authentication/authorization services 220 to determine what access the specific network security element may have to the security information available via the grid.

Archiver service 195 is a base service that may operate to archive security information for real-time and long term storage. Archiver service 195 is a primary recipient of security information and may sit on top of a database (e.g., a distributed database). For example, there may be certain information (e.g., the topology of the network) that is used by all systems that connect to security grid 20. Therefore, rather than having all of the systems get this information themselves, the archiver service 195 may gather this information for use by all the different systems Indexer/Directory 210 service, also referred to as Indexer and Security Directory service, is a combination of one or services configured to index the security information (real-time/archive) for optimal use by other services. Indexer and Security Directory service may be a separate service or a sub-service activated when the archiver service 195 is activated. A variety of indexes may be used to enable efficient lookup of information related to the index. Example indexes include, but are not limited to, Media Access Control (MAC) address, IP address, username, port, device, site, incident, etc.

Querier service 220 is configured to perform queries on behalf of other services/elements over the real-time or the archived long-term storage. This may make use of the indexer/directory service(s). Querier service 220 may be a separate service or a sub-service activated when the archiver service 195 is activated.

Correlator service 215 consumes security data to produce a result (e.g., alarm, security enforcement action, etc.,) and may send the results to one or more security information consumers. More specifically, correlator service 215 executes one or more correlation engines that correlate security state, events, and other information into an actionable output. The correlation engines may, over time, search for and identify specific events or security issues that impact the security of the network. For example, the correlation engines may identify an attack on the network, correlate how the attack could be mitigated (e.g., new signature, etc.), and provide the information to one or more network security elements for improvement of the operation of the network. Correlator service 215 may operate over real-time or archived data.

Reporter service 205 creates defined reports over real-time or archived data. More specifically, reporter service 205 is designed to run queries (by invoking queries on the querier service) and formulate the results of the queries into reports and/or result sets for consumption by other services or network security elements 170. Some reports may be scheduled and automatically invoked by the reporter service 205, while other reports may be invoked ad hoc on behalf of another service or network security element 170.

Global Threat Correlation (GTC) integration service 230 is an example of an integration service. GTC integration service 230 could enable the security grid 20 to act on reputation data from other customer sites. Policy enforcement service 225 is an example of an intelligence service that consumes event data and publishes policy changes based on analysis of current authenticated user events.

The grid services 190 of FIG. 2 are provided merely to illustrate that the security grid 20 includes the ability to implement various services that may operate as security information producers or security information consumers to add functionality to the grid. Other types of services may be implemented instead of, or in addition to, the above services.

Figure 3:
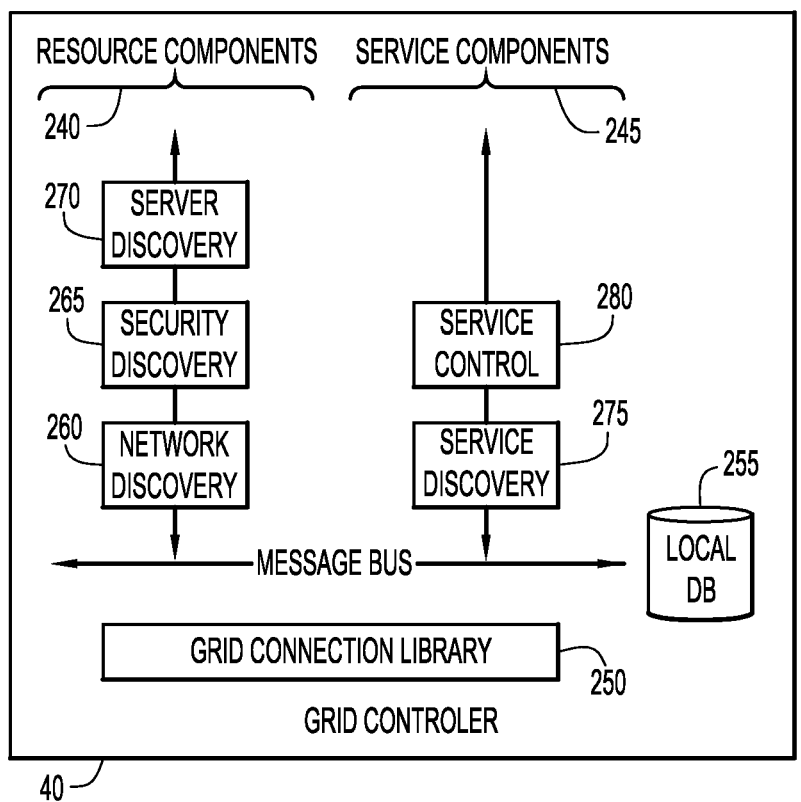
FIG. 3 is a logical block diagram of a grid controller configured to control the operation of a security grid in the integrated security platform.

FIG. 3 is a logical block diagram of one implementation of grid controller 40 of FIG. 2. Grid controller 40 includes resource components 240, service components 245, a grid connection library 250, and a local database (DB) 255. The resource components 240 include network discovery component 260, security discovery component 265, and server discovery component 270. The service components 245 include service discovery components 275 and service control components 280.

The resource components 240 generally provide features that interact with network security elements 170. More specifically, the network discovery component 260 discovers network security elements 170 and their topologies, security discovery component 265 discovers security information on the network security elements 170, and server discovery component 270 discovers servers and services running on servers.

The grid controller 40 may use the resource components 240, as well as one or more of the above noted grid services 190, to determine what network security elements may access security grid 20, and what access rights the various network security may have. In operation, a network security element would come online and attempt to contact grid controller 40 through pre-provisioned communications or through the use of a discovery packet searching for the information and address of the grid controller 40. Once connectivity is established with the network security element, grid controller 40 executes an authentication process (e.g., certificate-based or one of many other different mechanisms). Once grid controller 40 has authenticated the network security element, the grid controller 40 may have, in database 255 accessible to the controller, rules that identify what the network security element (e.g., the specific element or for the type of element) is allowed to advertise and what type of information the element may access. The grid controller 40 would provide these rules to the network element, and the element would then, as described above, advertise what it is capable of producing and what information it may desire to subscribe.

Service components 245 generally provide features that interact with the grid services 190 (FIG. 2). More specifically, service discovery component 275 discovers new grid services on the network, and service control component 280 coordinates and controls the behavior of the grid services 190. The service control component 280 directs network security elements 170 to provide security information to the grid services 190. Database 255 includes information that enables the grid controller 40 to startup and launch other aspects of the security grid 20.

Grid connection library 250 may perform one of a number of different functions, but generally functions as a local storage of information for facilitation of connections to the grid controller 40. The local storage may include, for example, the Internet Protocol (IP) address of the grid controller 40, security credentials for connection to the grid controller 40 and other services, etc. Grid connection library 250 is a common software component shared by the grid controller 40, grid agents 180 (FIG. 2), and grid services 190.

As noted above, the security grid 20 provides a peer-to-peer communication fabric where the control logic is centralized but the actual data can be distributed multicast (i.e. pub-sub) or unicast (i.e. peer-to-peer). In other words, the integrated security platform is not a centralized model where all information is gathered by a single entity and then distributed to others. As such, the storage of information in grid connection library 250 or otherwise in security grid 20 is minor relative to the information that is exchanged by the grid connections themselves.

A feature of security grid 20 is the ability to leverage intelligence from other security sources (network security elements) and to automatically improve the behavior of the network based on this intelligence. One such example is for a direct connection between the correlator service 215 and other network security elements 170 in the network so that the other elements can directly benefit from, and automatically take corrective action based on, the threat assessment performed by the correlator service 215. Similarly, network security elements 170 may automatically feed identified attacks to correlator service 215 for analysis and improvement of the network as a whole.

The above described security grid 20 operates as a communication fabric for the sharing and leverage of security information between different network security elements.

Figure 4:
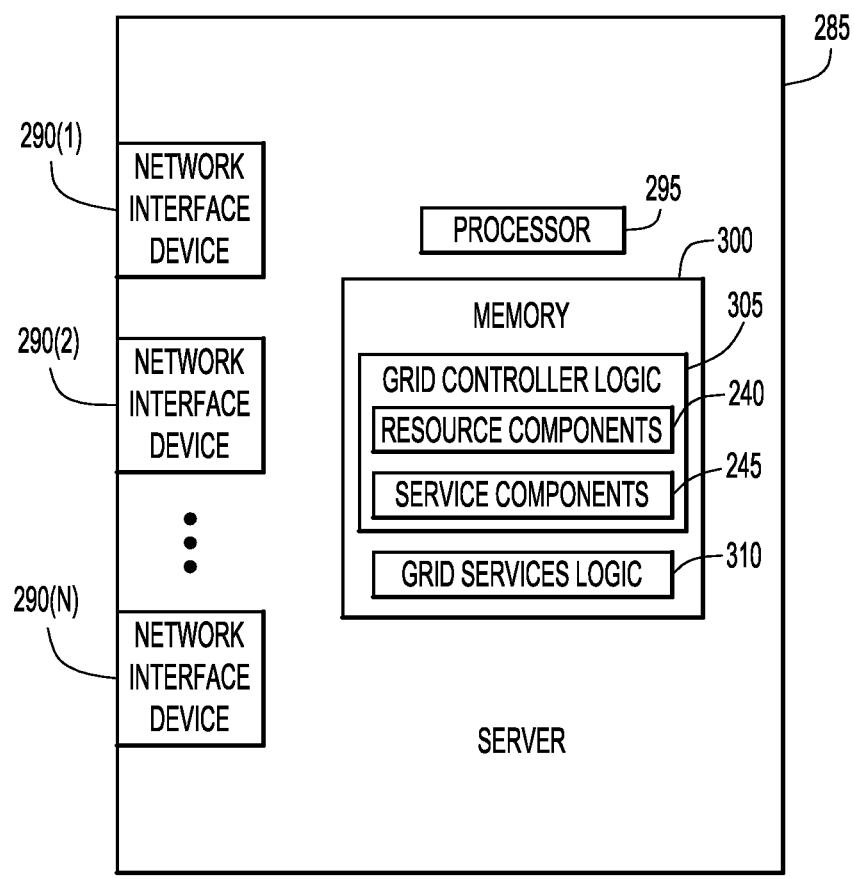
FIG. 4 is a schematic block diagram of a server on which a portion of the integrated security platform may be deployed.

The security grid 20 is, at least partially, implemented in hardware/software on one or more computing devices. FIG. 4 is a block diagram illustrating one example in which integrated security platform 15, and more particularly showing that security grid 20, is, at least partially, implemented on a server 285. That is, server 285 executes the functionality of a security grid, as described above. As shown, server 285 comprises a plurality of network interface devices 290(1)-290(N), a processor 295, and a memory 300. Memory 300 includes grid controller logic 305 comprising resource components 240 and service components 245, as described above. Memory 300 also comprises grid services logic 310.

Memory 300 may comprise read only memory (ROM), random access memory (RAM), magnetic disk storage media devices, optical storage media devices, flash memory devices, electrical, optical, or other physical/tangible memory storage devices. The processor 295 is, for example, a microprocessor or microcontroller that executes instructions for the grid controller logic 305 and grid services logic. Thus, in general, the memory 300 may comprise one or more tangible (i.e., non-transitory) computer readable storage media (e.g., a memory device) encoded with software comprising computer executable instructions and when the software is executed (by the processor 295) it is operable to perform the operations described herein in connection with grid controller logic 305 (i.e., the functionality described above for grid controller 40, including resource components 240, service components 245, etc.) and for grid services logic 310 (i.e., the functionality described above for the various grid services 190).

Figure 5:
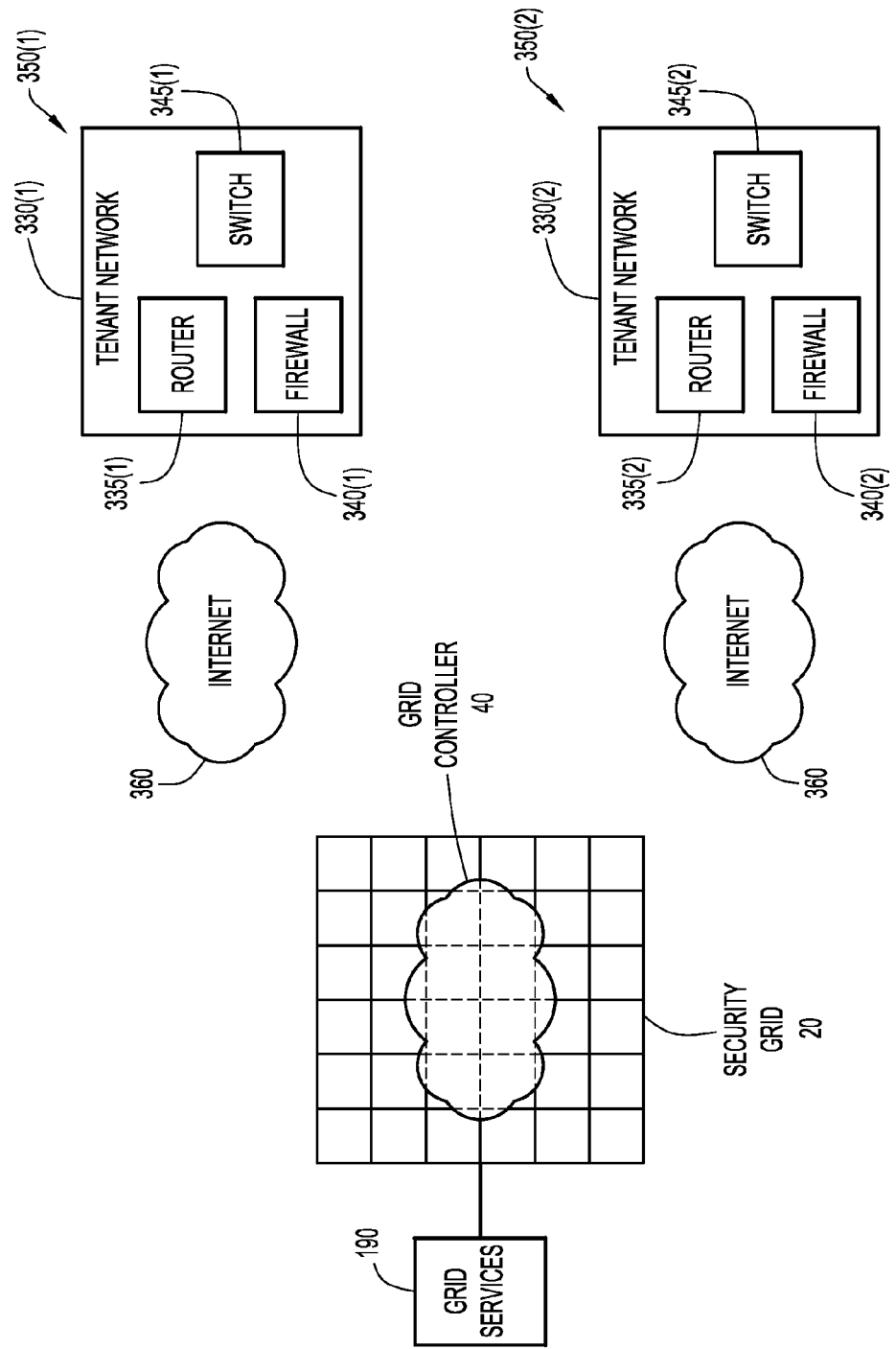
FIG. 5 is a block diagram of the integrated security platform deployed in a multi-tenant environment.

In accordance with examples described herein, integrated security platform 15 and security grid 20 are configured for communication over a cloud such that there is no requirement that base services, data storage, network elements, etc. actually reside on a single campus. This enables enterprise use of the integrated security platform 15 as well as service-provider based uses of the platform. One service-provider use of the integrated security platform 15 may be in a multi-tenant environment. FIG. 5 is a block diagram of such a multi-tenant environment in which one party hosts the security grid 20 and multiple different customers could feed their security information into the grid in a secure manner, such that the customer's data is isolated from the other customers. However, from the service provider's perspective, all of the information is visible.

More specifically, a first customer or "tenant" has a first computing network, referred to as tenant network 330(1), and a second customer has a second computing network, referred to as tenant network 330(2). Tenant network 330(1) comprises a router 335(1), a firewall 340(1), and a switch 345(1), collectively referred to as network security elements 350(1). Tenant network 330(2) comprises a router 335(2), a firewall 340(2), and a switch 345(2), collectively referred to as network security elements 350(2). The network security elements 350(1) and 350(2) in each of tenant networks 330(1) and 330(2) are connected to security grid 20 via the Internet 360. For ease of illustration, the connections between tenant networks 330(1)-330(2) and integrated security grid 20 have been omitted from FIG. 5.

In the example of FIG. 5, multiple customers (e.g., first and second customers) each having their own network would have access to the services and functionality, as described above, of security grid 20. That is, network security elements 350(1) would be able to share security information with one another and with grid services 190 while, similarly, network security elements 350(1) would be able to share security information with one another and with grid services 190. However, there is a logical separation between the customers such that the first and second customer's devices do not share or see each other's data. Integrated security grid 20, grid controller 40, and grid services 190 may be configured to handle (i.e., be shared between) any number of different tenant networks and their associated network security elements.

Figure 6:
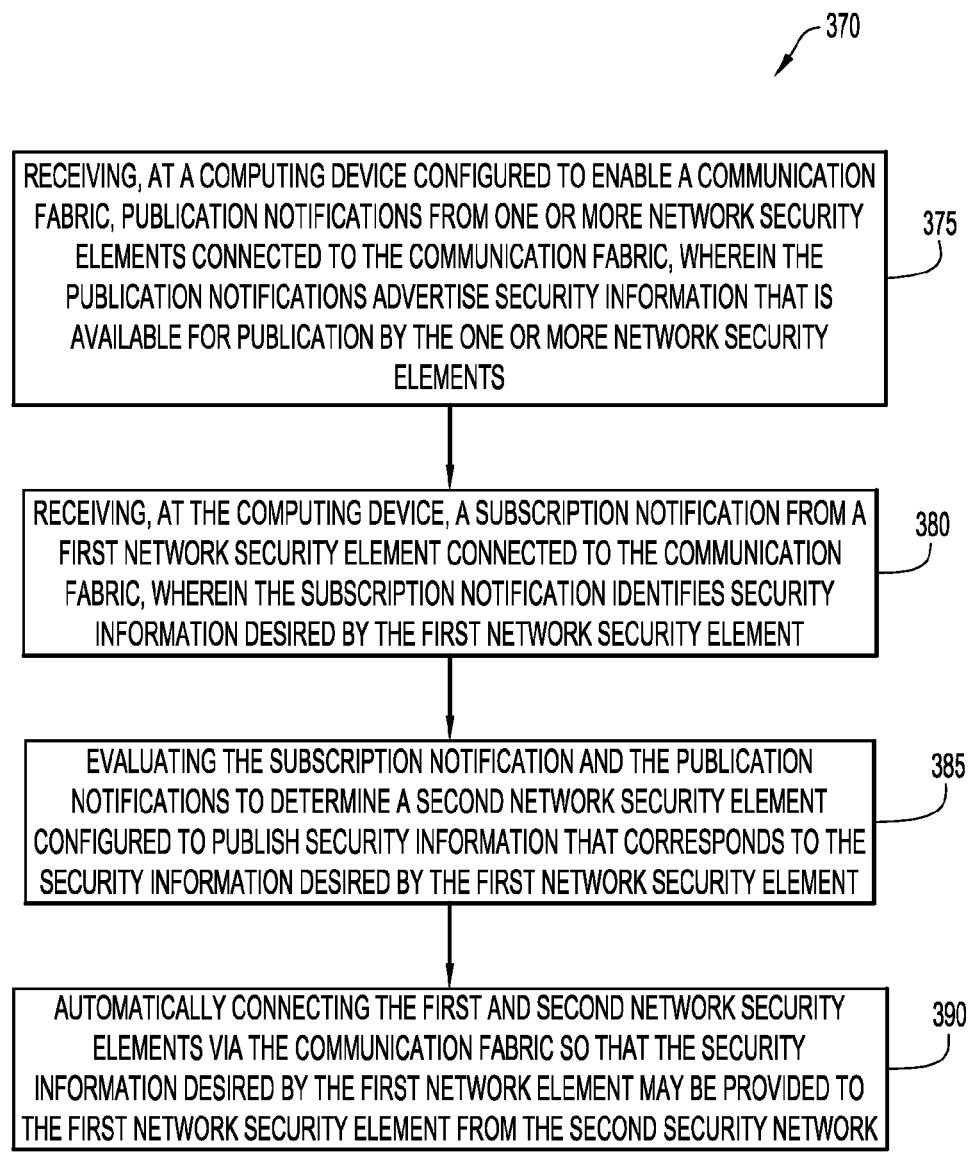
FIG. 6 is a high-level flowchart of operations performed by the integrated security platform.

FIG. 6 is a high-level flowchart illustrating a method 370 for use of a security grid (communication fabric) implemented on a computing device, such as a server. Specifically, at 375 publication notifications are received, at the computing device, from one or more of a plurality of network security elements in a computing network. The publication notifications identify security information available for publication by the one or network security elements. At 380, a subscription notification is received, at the computing device, from a first of the plurality of network security elements. The subscription notification identifies security information to which the first security element desires to subscribe. At 385, the publication and subscription notifications are evaluated to determine a second of the plurality of network security elements that is capable of publishing security information corresponding to the security information that the first network security element desires to subscribe. At 390, the first and network security elements are automatically connected to (directly) share the corresponding security information, via the communication fabric. This connection is created without a pre-existing relationship (i.e., no authentication) performed between the first and second network security elements.

The use of an integrated security platform and security grid, as described above, may provide one or more advantages over conventional arrangements. For example, the disclosed techniques provide for automation of policy and security enforcement based on intelligence gathered by the various elements. Simpler integration with services running over the network and the control plane of the network is achieved such that security is ensured on the control plane and the services. Furthermore, scalability is achieved as a result of the virtual data store, thereby enabling new security sub-systems to leverage security data that was previously cost prohibitive for both the developer and the customer. Additionally, the focus for both the application developer and customers can be on the "use" of the data, rather than the gathering, aggregation, indexing and maintenance of the data. The security platform described herein may minimize the time-to-market for new security related applications built on top of the platform and maximize the value of the underlying infrastructure that enables this platform, as it can be built on devices already existent in the network rather than deploying new devices. Multiple disparate security tools/applications are assimilated into a universal/unified platform from which situational awareness and policy awareness can be leveraged to efficiently and effectively impact security posture across a wide range of security functions without requiring individual administration and manual correlation of the individual security tools/applications.

The above description is intended by way of example only.

What is claimed is:

1. A method comprising:
    receiving, at a computing device configured to enable a communication fabric, publication notifications from one or more network security elements connected to the communication fabric, wherein the publication notifications advertise security information that is available for publication by the one or more network security elements;
    receiving, at the computing device, a subscription notification from a first network security element connected to the communication fabric, wherein the subscription notification identifies security information desired by the first network security element;

evaluating the subscription notification, and the publication notifications to determine a second network security element configured to publish security information that corresponds to the security information desired by the first network security element;

automatically connecting the first and second network security elements via the communication fabric so that the security information desired by the first network security element may be provided to the first network security element from the second network security element;

generating, at the first network security element, analyzed security information based on the security information provided from the second network security element; and advertising that the analyzed security information is available.

2. The method of claim 1, further comprising:
forwarding the publication notifications to one or more other network security elements connected to the communication fabric.

3. The method of claim 1, further comprising:
forwarding the subscription notifications to the one or more network security elements.

4. The method of claim 1, wherein connecting the first and second network security elements comprises:
connecting the first and second network security elements without a prior exchange of authentication information between the first and second network security elements.

5. The method of claim 1, further comprising:
receiving a request from an additional network security element to connect to the communication fabric;
authenticating the additional network security element; and
authorizing communications allowed by the additional network security element via the communication fabric.

6. The method of claim 5, further comprising:
connecting the additional network security element to the second network security element via the communication fabric so that the security information desired by the first network security element may be provided to the first network security element and the additional security network element.

7. The method of claim 1, wherein the first network security element is configured to perform one or more operations on the security information received from the second network security element to generate the analyzed security information, and further comprising:
receiving a publication notification from the first network security element indicating that the analyzed security information is available for publication.

8. The method of claim 7, further comprising:
automatically connecting a third network security element to the first network security element so that the analyzed security information may be provided to the third network security element.

9. The method of claim 7, further comprising:
receiving the analyzed security information at the computing device; and
automatically adjusting the operation of the communication fabric based on the analyzed security information.

10. The method of claim 1, further comprising:
receiving a query from at least one of the one or more network security elements requesting an identification of security information available for publication by other network security elements.

11. The method of claim 1, further comprising:
receiving a first set of security information at a first service implemented within the communication fabric;
analyzing the first set of security information with the service to generate service-analyzed security information; and
advertising the availability of the service-analyzed security information.

12. The method of claim 1, wherein first and second tenant computing networks are connected to the communication fabric, and wherein the first and second network security elements are associated with the first tenant computing network and wherein connecting the first network security element to the second network security element comprises:
connecting the first network security element to the second network security element via the communication fabric in manner that all transferred information is isolated from the second tenant computing network.

13. The method of claim 1, further comprising:
virtually indexing the security information that is available for publication by the one or network security elements.

14. One or more non-transitory computer readable storage media encoded with software comprising computer executable instructions and when the software is executed operable to:
receive, at a computing device configured to enable a communication fabric, publication notifications from one or more network security elements connected to the communication fabric, wherein the publication notifications advertise security information that is available for publication by the one or more network security elements;
receive, at the computing device, a subscription notification from a first network security element connected to the communication fabric, wherein the subscription notification identifies security information desired by the first network security element;
evaluate the subscription notification and the publication notifications to determine a second network security element configured to publish security information that corresponds to the security information desired by the first network security element; and
automatically connect the first and second network security elements via the communication fabric so that the security information desired by the first network security element may be provided to the first network security element from the second network security element, and wherein the first network security element generates analyzed security information based on the security information provided from the second network security element, and the first network security element advertises that the analyzed security information is available.

15. The non-transitory computer readable storage media of claim 14, wherein the instructions operable to connect the first and second network security elements further comprise instructions operable to:
connect the first and second network security elements without a prior exchange of authentication information between the first and second network security elements.

16. The non-transitory computer readable storage media of claim 14, further comprising instructions operable to:
receive a request from an additional network security element to connect to the communication fabric;
authenticate the additional network security element; and
authorize communications allowed by the additional network security element via the communication fabric.

17. The non-transitory computer readable storage media of claim 14, wherein the first network security element is configured to perform one or more operations on the security information received from the second network security element to generate the analyzed security information, and wherein the computer readable storage media further comprise instructions operable to:
   receive a publication notification from the first network security element indicating that the analyzed security information is available for publication.

18. The non-transitory computer readable storage media of claim 17, further comprising instructions operable to:
   automatically connect a third network security element to the first network security element so that the analyzed security information may be provided to the third network security element.

19. The non-transitory computer readable storage media of claim 17, further comprising instructions operable to:
   receive the analyzed security information at the computing device; and
   automatically adjust the operation of the communication fabric based on the analyzed security information.

20. The non-transitory computer readable storage media of claim 14, further comprising instructions operable to:
   virtually index the security information that is available for publication by the one or network security elements.

21. The non-transitory computer readable storage media of claim 14, wherein first and second tenant computing networks are connected to the communication fabric, and wherein the first and second network security elements are associated with the first tenant computing network and wherein the instructions operable to connect the first network security element to the second network security element comprise instructions operable to:
   connect the first network security element to the second network security element via the communication fabric in manner that all transferred information is isolated from the second tenant computing network.

22. An apparatus comprising:
   a plurality of network interfaces configured to receive publication notifications from one or more network security elements, wherein the publication notifications advertise security information that is available for publication by the one or more network security elements, and to receive a subscription notification from a first network security element, wherein the subscription notification identifies security information desired by the first network security element; and
   a processor configured to evaluate the subscription notification and the publication notifications to determine a second network security element configured to publish security information that corresponds to the security information desired by the first network security element, and to automatically connect the first and second network security elements so that the security information desired by the first network security element may be provided to the first network security element from the second network security element, and wherein the first network security element generates analyzed security information based on the security information provided from the second network security element, and the first network security element advertises that the analyzed security information is available.

23. The apparatus of claim 22, wherein the processor is configured to connect the first and second network security elements without a prior exchange of authentication information between the first and second network security elements.

24. The apparatus of claim 22, wherein the first network security element is configured to perform one or more operations on the security information received from the second network security element to generate the analyzed security information, and the processor is configured to receive a publication notification from the first network security element indicating that the analyzed security information is available for publication.

25. The apparatus of claim 24, wherein the processor is configured to automatically connect a third network security element to the first network security element so that the analyzed security information may be provided to the third network security element.

26. The apparatus of claim 24, wherein the processor is configured to receive the analyzed security information at the computing device and automatically adjust the operation of the communication fabric based on the analyzed security information.

* * * * *